(12) United States Patent
Rahman

(10) Patent No.: US 7,826,443 B1
(45) Date of Patent: Nov. 2, 2010

(54) METHOD FOR NETWORK-BASED REMOTE IMS CPE TROUBLESHOOTING

(75) Inventor: Moshiur Rahman, Marlboro, NJ (US)

(73) Assignee: AT&T Corp., New York, NY (US)

( * ) Notice: Subject to any disclaimer, the term of this patent is extended or adjusted under 35 U.S.C. 154(b) by 236 days.

(21) Appl. No.: 11/985,794

(22) Filed: Nov. 16, 2007

(51) Int. Cl.
*H04L 12/66* (2006.01)

(52) U.S. Cl. .................. 370/353; 370/352; 370/260; 370/373; 370/385; 370/386

(58) Field of Classification Search .................. 370/352, 370/242, 241, 493, 353, 260, 373, 385, 386, 370/400
See application file for complete search history.

(56) References Cited

U.S. PATENT DOCUMENTS

| | | | |
|---|---|---|---|
| 5,809,108 A * | 9/1998 | Thompson et al. | 379/10.02 |
| 5,999,516 A * | 12/1999 | Suzuki et al. | 370/244 |
| 6,434,140 B1 * | 8/2002 | Barany et al. | 370/352 |
| 6,957,257 B1 * | 10/2005 | Buffalo et al. | 709/224 |
| 7,113,515 B2 * | 9/2006 | Hoffman | 370/401 |
| 7,142,537 B2 * | 11/2006 | Shores et al. | 370/389 |
| 7,173,910 B2 * | 2/2007 | Goodman | 370/252 |
| 7,206,582 B2 * | 4/2007 | Tom et al. | 455/445 |
| 7,245,609 B2 * | 7/2007 | D'Eletto | 370/352 |
| 7,542,481 B2 * | 6/2009 | Faccin et al. | 370/469 |
| 2004/0073658 A1 * | 4/2004 | Oran et al. | 709/224 |
| 2005/0163104 A1 * | 7/2005 | Christensen et al. | 370/352 |
| 2005/0213564 A1 * | 9/2005 | Nguyen et al. | 370/352 |
| 2006/0187850 A1 * | 8/2006 | Ward et al. | 370/252 |
| 2006/0203801 A1 * | 9/2006 | Li et al. | 370/352 |
| 2007/0064622 A1 * | 3/2007 | Bi et al. | 370/254 |
| 2007/0064714 A1 * | 3/2007 | Bi et al. | 370/401 |
| 2007/0253435 A1 * | 11/2007 | Keller et al. | 370/401 |
| 2008/0057937 A1 * | 3/2008 | Kotelba | 455/423 |
| 2008/0267169 A1 * | 10/2008 | Mundra et al. | 370/352 |

* cited by examiner

*Primary Examiner*—Ricky Ngo
*Assistant Examiner*—Dewanda Samuel

(57) ABSTRACT

A method for use in an IMS VoIP Network provides for remote troubleshooting of a CPE problem. After receiving a customer complaint, customer care begins the troubleshooting process, collecting and compiling information to send to the test platform. The test platform constructs a SIP test call request instruction and sends it to the CPE. The process is repeated for a number of test calls. If there is no response from any of the test calls, it is concluded that the CPE is in trouble. The results are reported to Customer Care Center, which can use those results to take action to resolve the problem. In another embodiment, after failure of all of the test calls, another SIP instruction is sent to run diagnostics on the CPE. The diagnostic results are reported to Customer Care Center, which can take action based on those results to resolve the problem.

20 Claims, 3 Drawing Sheets

METHOD FOR NETWORK-BASED REMOTE IMS CPE TROUBLESHOOTING

FIELD OF THE INVENTION

The present invention relates generally to providing networked based IP Multimedia Subsystem (IMS) services. More particularly, the present application relates to remote testing of customer premises equipment (CPE), to attain the status of the CPE on demand, to verify customer complaints, and to enable the maintenance platform to detect network problems causal to call failure.

BACKGROUND OF THE INVENTION

The IP Multimedia Subsystem (IMS) is an architectural framework for delivering Internet Protocol (IP) multimedia to mobile and other users. With the increasing variety of access networks and types of CPE providing IMS VoIP network services, troubleshooting customer complaints in CPE has become a serious problem. Currently, if there is a customer complaint as a result of a service outage, customer support must go through a painstaking and time-consuming effort to "manually" troubleshoot the source of the outage. One problem with manual troubleshooting is that it can be very difficult to fully understand the true nature of the customer complaint and also to understand the source of the problem. Another problem with manual troubleshooting is that it can be expensive because it often results in dispatching human service personnel to customer sites. Further, troubleshooting the customer complaint may erroneously indicate that the CPE is causing the issue, but the issue may not necessarily be with the CPE at all. A diagnosis pointing to the CPE may, in fact, be indicative of a symptom of a larger network problem.

An IMS VoIP network, also known as a "fast packet" network, is a telecommunications network allowing all digital, broadband, multimedia communications between calling and called parties. Fast-packet networks generally operate without real-time network control and with little or no operations system support. The existing operations systems are not particularly suited for use in fast-packet networks, at least not without modification.

New development work on operations systems for fast-packet networks has been based on the same operations architecture that has been used in the circuit switched network. That is, each fast-packet switch is interfaced directly with a family of operations systems. Thus operations system development for fast packet networks has been characterized with the disadvantages of high cost and inefficiency of circuit switched networks.

Currently in an IMS VoIP network, there is no quick way to validate a customer complaint that relates to a potential CPE problem. Such problems include no dial tone, ring-no-answer, call does not complete, no response from the network, and residential gateway (RG) is not working. In response to CPE related complaints, the customer support personnel execute expensive and time consuming verification procedures that require spending additional time interviewing the customer or dispatching repair personnel to the CPE site.

In many cases, a customer must report problems making a call to the IMS VoIP service provider. The service provider must then provide support in real time to try to determine where the problem is originating and how best to deal with it. While manual troubleshooting is taking place, the customer is out of service completely. Depending on the type of trouble, delay in return to service can be substantial. Worse, a problem could propagate to other areas of the network, resulting in a serious network outage.

There therefore remains a need for a cost-effective technique to identify and cure the source of problems in a CPE, while minimizing the above-described disadvantages.

SUMMARY OF THE INVENTION

The present invention addresses the needs described above by providing a method for remote troubleshooting of a target Customer Premises Equipment (CPE) in an IP Multimedia Subsystem (IMS) network including a customer care center. The method includes the steps of receiving a message from the customer care center, the message containing customer complaint information about the target CPE; and transmitting a session initiation protocol (SIP) call setup request to test the target CPE.

The method may further comprise the step of determining uniform resource identifiers (URIs) of the target CPE and a second CPE; wherein the SIP call setup request includes URIs of the target CPE and the second CPE. The SIP call setup request may be an INVITE message to the target CPE. The INVITE message may be a delayed media message without session description protocol (SDP).

The method may further comprise the step of repeating the transmitting step until one of a test call confirmation and a test failure determination occurs. In that case, the test call confirmation may comprise a "200 OK" confirmation message from the target CPE. The failure determination may occur upon execution of the step of transmitting a SIP call setup request a predetermined number of times without receiving a test call confirmation. Alternatively, the failure determination occurs upon repeated execution of the step of transmitting a SIP call setup request for a predetermined time period without receiving a test call confirmation.

The method may further comprise the steps of making a test failure determination on the SIP call setup request; and transmitting a SIP instruction test request for diagnostics to the target CPE. In that case, diagnostics test results may be received including SIP signaling data relating to the test call setup request.

Another embodiment of the invention is a maintenance platform for remote troubleshooting of Customer Premises Equipment (CPE) in an IP Multimedia Subsystem (IMS) network. The network includes a customer care center. The platform comprises memory having computer readable instructions stored thereon for execution by a processor to perform the methods described above.

DESCRIPTION OF THE INVENTION

Figure 1:
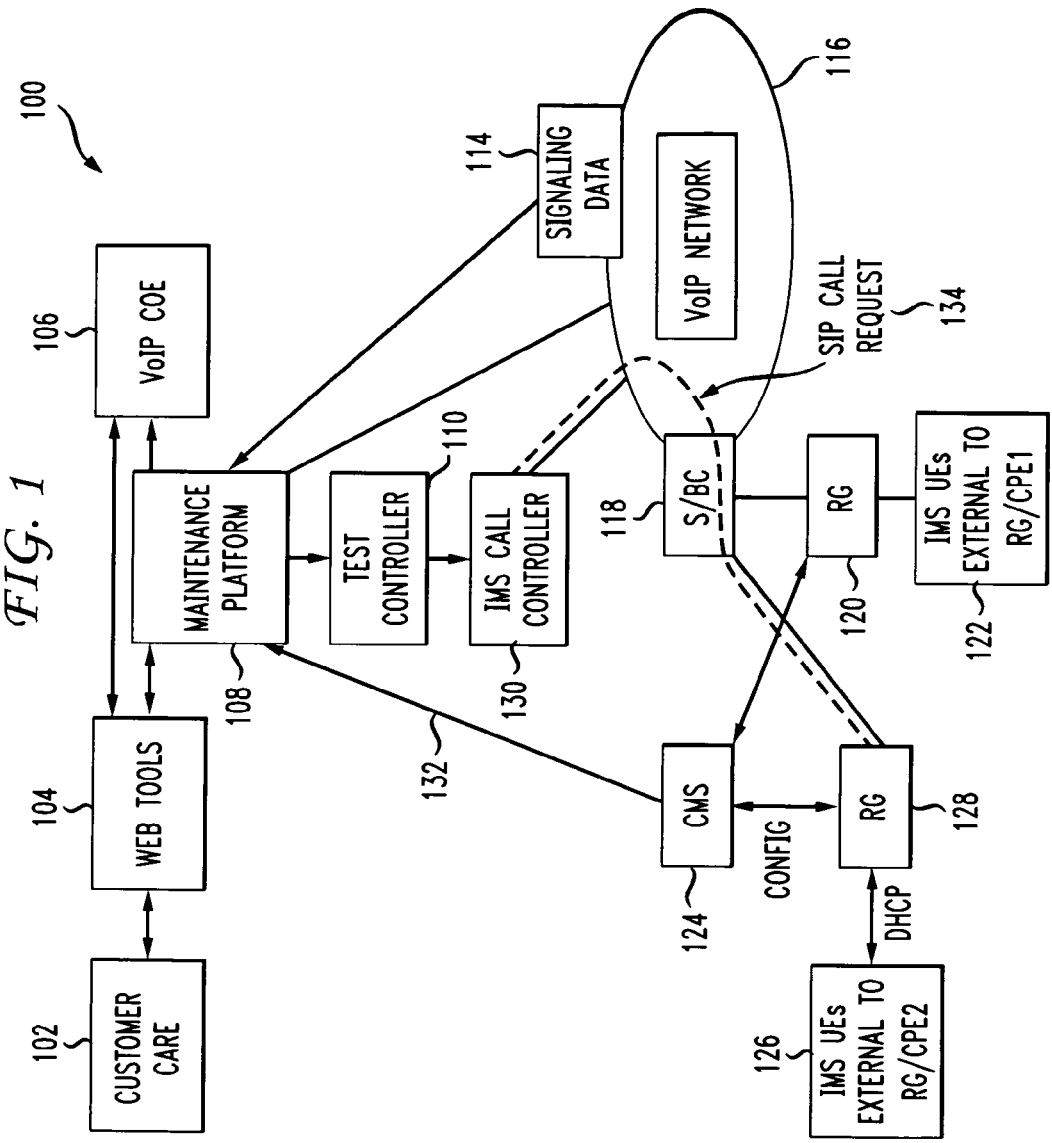
FIG. 1 is a schematic representation of an IMS VoIP telecommunications network including indication of a SIP test call.

The inventors have developed a method and apparatus for conducting a remote troubleshooting process for potential CPE (Customer Premises Equipment) problems. An IMS VoIP telecommunications network 100, according to one embodiment of the invention, is shown in FIG. 1.

The IMS VoIP telecommunications network architecture 100 includes a path for a SIP test call. In this network configuration, the main components include a maintenance platform 108, test controller 110, an IMS call controller 130, session border controller (SBC) 118, residential gateway (RG) 120, a CPE under test or target CPE2 126, a call initiator CPE1 122, CPE management system (CMS) 124, and VoIP network 116 over which ongoing network traffic as well as control and test traffic are conducted. Additionally, customer support includes customer care center 102, web tools 104, and VoIP central office equipment (COE) 106.

The RG 120, located in the customer's house, is connected to the VoIP network 116 via the S/BC 118. The S/BC 118 is the VoIP component that provides the signaling and the user data path between the end user and the network. RG 128 includes home equipment that supports modem capability and in-house data traffic distribution. The CMS 124 is a network element that collects fault management data from the RGs 120, 128 and the CPEs 126, 122 and sends reports including call signaling data 132 to the maintenance platform 108. The maintenance platform 108 performs fault and performance management. Customer care center 102 interfaces with the end user and the maintenance platform 108 via web tools. VoIP COE 106 is a network management center for the VoIP network 116.

The customer care center 102 can request a test, such as a SIP call, to be setup between the target CPE2 126 that is the subject of the customer complaint and another end point CPE, designated CPE1 122. The IMS call controller 130 requests a call setup by sending a SIP call setup message to the target CPE2 126. An example of a SIP call setup message is INVITE. If the target CPE2 126 is healthy, it will respond to the SIP call setup INVITE request. If the target CPE2 126 is not functioning, then IMS call controller 130 will time out. That test can be repeated for some specified number of times. In the case of no response for all the test calls, it can be concluded that there is a problem with the target CPE2 126.

Results from the SIP test calls are collected by the CMS 124 and sent to the maintenance platform 108. This architecture may also initiate an alternative SIP test instruction in the form of a diagnostic request to be run at the target CPE2 126. All the messages to CPE1 122 and CPE 2 126 travel through the RG 120, and RG 128, respectively.

The customer care center 102 is responsible for initiating diagnostics and resolving technical problems with the CPE in response to a customer indication of a failure. Those technical problems include the CPE problems to which the method of this invention is addressed.

The method provides network-based remote IMS troubleshooting of the CPE on a live network by the construction of real time SIP instructions 134 that direct a call to be set up between the customer-identified CPE2 126 and another CPE 122, collecting resulting call signaling data 132, and then analyzing the results.

The other or call initiator CPE 122 is chosen by the test platform. That initiator CPE 122 may, for example, be in the maintenance platform 108 or it may be any customer CPE including the CPE of an internal customer. The only constraint is that the CPE must be capable of initiating a call to the second customer identified CPE under test.

In one embodiment, the request for a SIP test call is placed and may be repeated for some number of times. If the target CPE 126 does not respond to the SIP call setup request then the IMS network call controller 130 will time out. If the CPE in question 126 does not respond to the test calls, it can then be concluded that the customer identified CPE 126 is in trouble. The data 132 resulting from the SIP call set up request is sent to the customer care center 102. The customer care center 102 can use this information in dispatching repair personnel.

In another embodiment, after the final test call request times out, another SIP test request 134 may be constructed to run diagnostics on the target CPE 126. The results 132 from the SIP instruction request for diagnostics are collected by the CMS 124 and sent to customer care 102 for use in final problem resolution.

The CPE may include one or more modems, computers, telephones, televisions, and RGs. An RG (Residential Gateway) is a broadband home network interface used to connect residential equipment such as TV, PC, and telephone to the broadband network.

To initiate the process of remote troubleshooting the CPE, a customer care agent 102 first interviews the caller to log the complaint information. That process usually results from a customer calling to report a problem in service. Customer care 102 compiles data from both the customer call and also from stored subscriber information using web tools 104. The compiled information is then forwarded to the maintenance platform 108 where the problem (target) CPE 126 is identified. The compiled information includes the specific address of the target CPE 126 in the form of a URL. The necessary information is then passed to the test platform 110 where a SIP signaling message 134 is constructed and sent into the VoIP Network 116 to initiate a test call to the target CPE 126. SIP is a standard real time protocol used to set up IP voice calls and other operations in a VoIP network.

As shown in FIG. 1, in response to the test call, the CMS (CPE Management System) node 124 collects fault data from the end user equipment (RGs 120, 128. The CMS 124 then sends those test results to the maintenance platform 108. The customer care center 102 uses these results for final trouble resolution with the customer. In the case that the test call completes normally, the CPE 126 is determined to be OK and troubleshooting is resolved. In the case that the test call does not complete, the CMS node 124 returns time-out data to the maintenance platform 108 and ultimately to the customer care center 102 for further processing.

In the case that the target CPE 126 equipment is not responsive and results in a time out message being sent to the maintenance platform 108, further testing is done to determine the nature of the fault more specifically. That further testing includes a second SIP test instruction being sent to the target CPE 126. The second test instruction is set up in the test controller 110 using SIP signaling protocol. The test controller formats a SIP instruction request to run diagnostics on the CPE 126. Similar to the SIP test call instruction, the SIP test directive is monitored through the CMS node 124. The CMS node 124 sends diagnostic results to the maintenance platform 108. The customer care center 102 uses those diagnostic results for final trouble resolution.

The S/BC (Session/Border Controller) 118, shown in FIG. 1, is a device that may be used in VoIP networks to control signaling and media streams involved in setting up, conducting, and tearing down calls.

The present invention gives customer care 102 the option to troubleshoot a problem remotely before sending any repair personnel to a customer site. With "always-on" broadband access (DSL or cable), it is feasible to remotely obtain the CPE status using the proposed troubleshooting technique.

Figure 2:
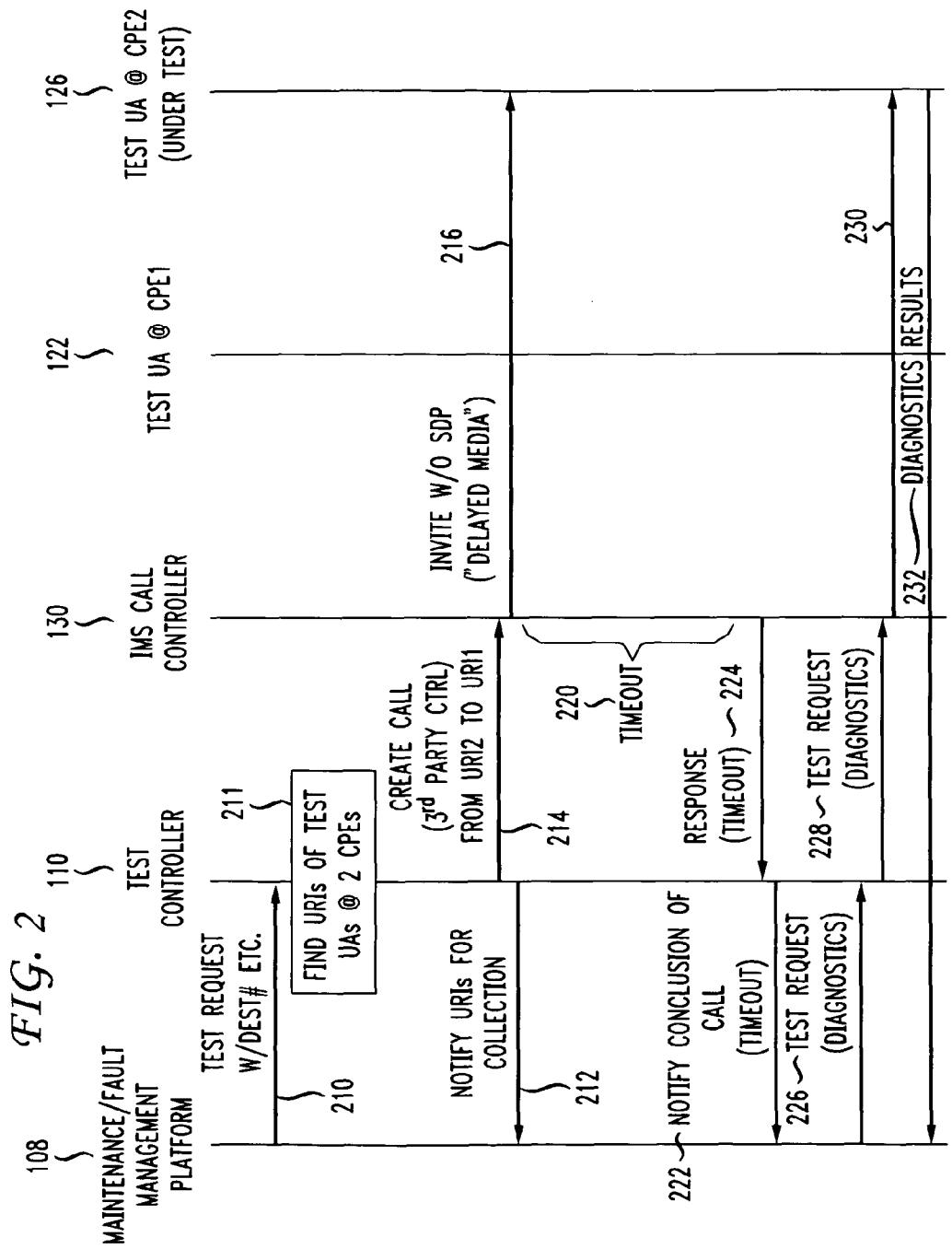
FIG. 2 is a time flow diagram depicting an unsuccessful SIP test call according to one embodiment of the invention.

As noted, the maintenance platform 108 initiates troubleshooting upon receiving the customer complaint data. A sequence of events for this method in which a customer-identified CPE is found to have a problem is depicted in FIG. 2. First, the maintenance fault platform 108 compiles the test call data 210 including addresses for a first CPE 122 and a second (target) CPE 126. That information is transmitted to the test controller 110. The test controller 110 finds the Uniform Resource Identifiers (URIs) of the CPEs (step 211) and creates the SIP instruction 214. The IMS call controller 130 sends the request 216 to the second (target) CPE 126 to initiate a call to the first CPE 122. The test controller 110 also sends a notify message 212 to the maintenance platform 108 including the URL addresses of the first and the second CPEs 122, 126.

When no call initiation is received from the second CPE 126, there is a timeout 220. The IMS call controller 130 detects the timeout as a no reply from the second CPE 126 and passes the timeout message 224 to the test controller 110. The test controller 110 transmits a conclusion of call message 222 to the maintenance/fault management platform 108.

The maintenance platform 108 may then initiate a diagnostics procedure by transmitting a test request for diagnostics message 226 to the test controller 110. The test controller then formats and transmits a SIP instruction request 230 to run diagnostics on the target CPE 126. Diagnostics test results 232 from the diagnostics run on the CPE2 126 are transmitted back to the maintenance platform 108 through the CMS node 124 (FIG. 1). The results are used at the maintenance platform 108 to resolve the problem.

Figure 3:
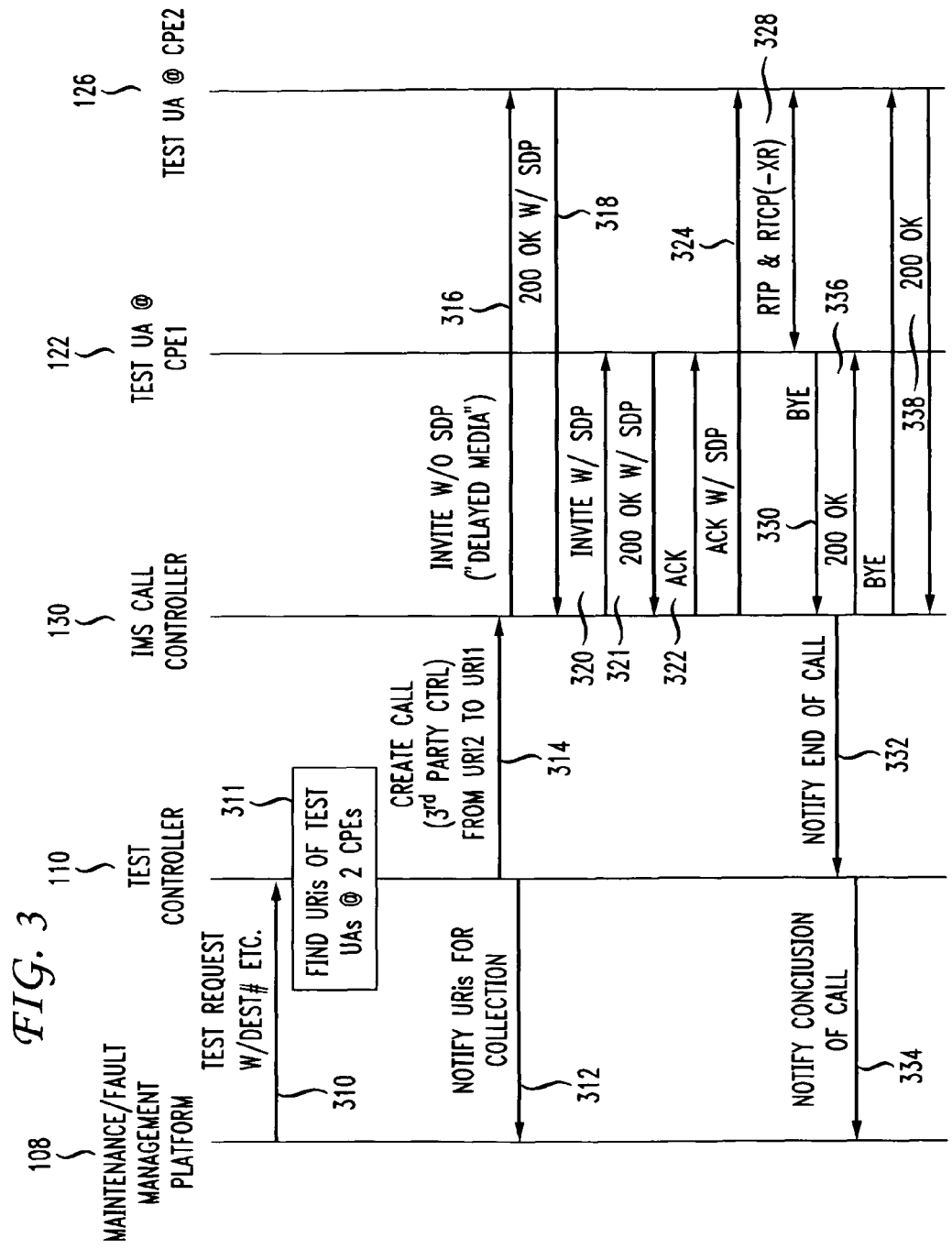
FIG. 3 is a time flow diagram depicting a successful SIP test call according to one embodiment of the invention.

FIG. 3 shows the call flow in a case where a test call is successfully placed by the target CPE2 126. Initially, the steps are the same as those shown in FIG. 2 with reference to an unsuccessful call sequence. The maintenance platform 108 compiles the test call data including addresses for a first CPE 122 and a second (target) CPE 126. After finding the URIs of the test CPEs (step 311), the test controller 110 creates and transmits the SIP instruction 314. The IMS call controller 130 sends an INVITE request 316 to the target CPE 126 to initiate a call to the first CPE 122. The test controller 110 also sends a notify message 312 to the maintenance platform 108 including the URI addresses of the first CPE 122 and the second (target) CPE 126.

Steps 318 through 338 represent a normal (successful) answer and acknowledge sequence for the test SIP instruction. A "200 OK" confirmation message 318, including session description protocol (SDP), is sent by the target CPE 126 to the IMS call controller 130, indicating successful receipt of the INVITE 316. Another INVITE message 320 is then transmitted by the controller 130 to the first CPE 122, which also responds with a "200 OK" message 321. The call controller then transmits ACK messages 322, 324 to the CPEs.

A real-time transport protocol (RTP) call 328 is set up between the CPEs 122, 126, and confirmation 330 is transmitted back to the call controller 130. The IMS call controller 130 sends a notify end of call message 332 indicating a successful call test call to the test controller 110. The test controller 110 sends a notify conclusion of call message 334 to the maintenance platform 110.

The method of the invention provides a new IMS VoIP Network service diagnostic feature for remote troubleshooting of the CPE in a fast, accurate and time-efficient way, enabling IMS VoIP Network service providers to provide high quality service. Given the rapid increase in the use of IMS VoIP Network and CPEs, the method has great potential in future systems.

The method furthermore reduces the need for real-time human service provider support. It requires no special knowledge of the customer; for example, the customer does not need to understand the CPE or the IMS VoIP Network platform. The method greatly reduces the time required to identify and correct a CPE problem or a relate network problem in an IMS VoIP Network.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to a remote troubleshooting method residing within an IMS VoIP Network, the method of the invention may be instead embodied by a stand-alone system that is connected to a IMS VoIP Network as a remote network element, for example. It is further noted that the invention is not limited to use with CPE, as described in this specification, but can be used with any communications network technology existing today or developed in the future. It is to be understood that the embodiments shown and described herein are only illustrative of the principles of the present invention and that various modifications may be implemented by those skilled in the art without departing from the scope and spirit of the invention.

What is claimed is:

1. A method for remote troubleshooting of a target customer premises equipment in an IP multimedia subsystem network including a customer care center, the method comprising:

receiving a message from the customer care center, the message containing customer complaint information about the target customer premises equipment;

transmitting over a call setup request path a session initiation protocol session initiation protocol call setup request to test the target customer premises equipment;

testing the target customer premises equipment by setting up a call between the target customer premises equipment and a second customer premises equipment according to the session initiation protocol call setup request;

at a customer premises equipment management system separate from the call setup request path and in communication with a first residential gateway associated with the target customer premises equipment and a second residential gateway associated with the second customer premises equipment, collecting from the residential gateways call signaling data resulting from the setting up of the call;

transmitting the call signaling data from the customer premises equipment management system to the customer care center; and at the customer care center, dispatching repair personnel based on the call signaling data.

2. The method of claim 1 further comprising:

determining uniform resource identifiers of the target customer premises equipment and the second customer premises equipment;

wherein the session initiation protocol call setup request includes uniform resource identifiers of the target customer premises equipment and the second customer premises equipment.

3. The method of claim 2, wherein the session initiation protocol call setup request is an INVITE message to the target customer premises equipment.

4. The method of claim 3, wherein the INVITE message is a delayed media message without session description protocol.

5. The method of claim 1 further comprising:
repeating the transmitting until one of a test call confirmation and a test failure determination occurs.

6. The method of claim 5, wherein the test call confirmation comprises a "200 OK" confirmation message from the target customer premises equipment.

7. The method of claim 5, wherein the failure determination occurs upon the transmitting of a session initiation protocol call setup request a predetermined number of times without receiving a test call confirmation.

8. The method of claim 5, wherein the failure determination occurs upon repeated transmitting of a session initiation protocol call setup request for a predetermined time period without receiving a test call confirmation.

9. The method of claim 1, further comprising:
making a test failure determination on the session initiation protocol call setup request; and
transmitting a SIP instruction test request for diagnostics to the target customer premises equipment.

10. The method of claim 9, further comprising:
receiving diagnostics test results including session initiation protocol signaling data relating to the test call setup request.

11. A maintenance platform for remote troubleshooting of customer premises equipment in an IP multimedia subsystem network including a customer care center, the platform comprising memory having computer readable instructions stored thereon for execution by a processor to perform a method comprising:
receiving a message from the customer care center, the message containing customer complaint information about the target customer premises equipment;
transmitting over a call setup request path a session initiation protocol call setup request to test the target customer premises equipment;
testing the target customer premises equipment by setting up a call between the target customer premises equipment and a second customer premises equipment according to the session initiation protocol call setup request;
at a customer premises equipment management system separate from the call setup request path and in communication with a first residential gateway associated with the target customer premises equipment and a second residential gateway associated with the second customer premises equipment, collecting from the residential gateways call signaling data resulting from the setting up of the call;
transmitting the call signaling data from the customer premises equipment management system to the customer care center; and
at the customer care center, dispatching repair personnel based on the call signaling data.

12. The maintenance platform of claim 11 wherein the method further comprises:
determining uniform resource identifiers of the target customer premises equipment and the second customer premises equipment; and
wherein the session initiation protocol call setup request includes uniform resource identifiers of the target customer premises equipment and the second customer premises equipment.

13. The maintenance platform of claim 12:
wherein the session initiation protocol call setup request is an INVITE message to the target customer premises equipment.

14. The maintenance platform of claim 13, wherein the INVITE message is a delayed media message without session description protocol.

15. The maintenance platform of claim 11 wherein the method further comprises:
repeating the transmitting until one of a test call confirmation and a test failure determination occurs.

16. The maintenance platform of claim 15, wherein the test call confirmation comprises a "200 OK" confirmation message from the target customer premises equipment.

17. The maintenance platform of claim 15, wherein the failure determination occurs upon the transmitting of a session initiation protocol call setup request a predetermined number of times without receiving a test call confirmation.

18. The maintenance platform of claim 15, wherein the failure determination occurs upon repeated transmitting of a session initiation protocol call setup request for a predetermined time period without receiving a test call confirmation.

19. The maintenance platform of claim 11 wherein the method further comprises:
making a test failure determination on the session initiation protocol call setup request; and
transmitting a session initiation protocol instruction test request for diagnostics to the target customer premises equipment.

20. The maintenance platform of claim 19 wherein the method further comprises:
receiving diagnostics test results including session initiation protocol signaling data relating to the test call setup request.

* * * * *